No. 679,575. Patented July 30, 1901.
L. C. REESE.
APPARATUS FOR EXTRACTING MATTER FROM LIQUIDS.
(Application filed July 5, 1898.)
(No Model.)
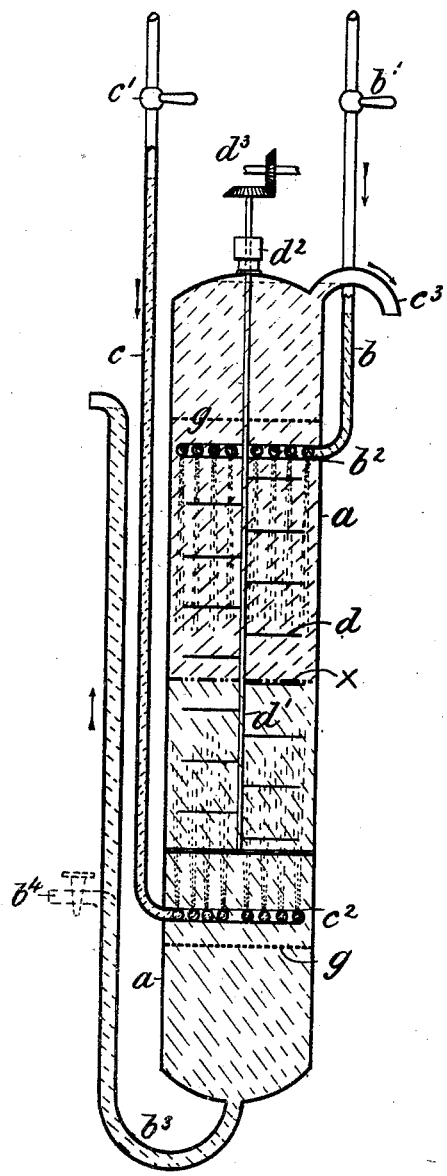

UNITED STATES PATENT OFFICE.

LOUIS CHARLES REESE, OF LONDON, ENGLAND, ASSIGNOR TO PAUL PFLEIDERER, OF HILLCREST, WELLINGTON, ENGLAND.

APPARATUS FOR EXTRACTING MATTER FROM LIQUIDS.

SPECIFICATION forming part of Letters Patent No. 679,575, dated July 30, 1901.

Application filed July 5, 1898. Serial No. 685,132. (No model.)

*To all whom it may concern:*

Be it known that I, LOUIS CHARLES REESE, a subject of the Emperor of Germany, and a resident of London, England, have invented certain new and useful Improvements in Apparatus for Extracting Matters from Liquids, (for which I have filed applications for patents in Great Britain, No. 29,387, dated December 11, 1897, and in France, dated June 10, 1898,) of which the following is a specification.

This invention relates to the extraction or separation from liquids of chemical products or matters dissolved chemically fixed or finely divided in suspension therein, and has reference to the attainment of such result by an improved application of the method in which liquid of different specific gravity than and non-miscible to a homogeneous liquid with the liquid to be treated and suitable, by reason of its easier dissolution of or its greater affinity for the matters to be extracted, to the obtainment of the desired result is used as the extracting, separating, or purifying agent, the object of the invention being to enable the treatment to be carried out in a continuous and automatic manner more completely than hitherto and with a more complete separation of the liquids after the treatment and at a considerable reduction of time and cost.

To the end aforesaid the invention consists in an extraction or separation chamber or battery of chambers, each so adapted as that the liquid to be treated and the treating liquid are caused to be maintained therein in superposed relation in respect to a plane (hereinafter termed the "meeting plane") in which they meet, and which is automatically maintained at a level predetermined according to the nature of the liquids within the space (hereinafter termed the "treating zone") between the respective inlets of such liquids, and as that each of such liquids is caused within such zone to pass in a minutely-divided condition through the body of the other in an opposite direction to the travel of the latter, and to be, in turn, when re-collected in bulk, in like manner passed through by the other liquid in a minutely-divided condition, and as that, in a space (hereinafter termed the "separating zone") of which there is one at each end of the chamber, between the inlet of each liquid and the outlet of the other liquid the outflowing liquid, before it escapes from the chamber, is separated from the other liquid, as hereinafter more fully explained with reference to the accompanying drawing, which represents a single such chamber in sectional elevation.

$a$ represents the chamber, which may be made of any suitable form, dimensions, and capacity, but is preferably cylindrical in cross-section and vertically arranged. At an upper part of the chamber is fitted an inlet-pipe $b$, leading from a reservoir of the heavier liquid (which may be the treating liquid or the liquid to be treated) and fitted with means $b'$ of controlling the inflow of such liquid and terminating within the upper part of the chamber in a perforated coil $b^2$, from which the liquid escapes in a finely-divided state into the chamber, descending therein. At a lower part of the chamber is fitted an inlet-pipe $c$, leading from a reservoir of the lighter liquid (which may be the liquid to be treated or the treating liquid) and fitted with means $c'$ of controlling the inflow of such liquid and terminating within the lower part of the chamber in a perforated coil $c^2$, from which the liquid escapes in a finely-divided state into the chamber, ascending therein. Other equivalent liquid-dispersing devices may be used in lieu of the coils $b^2$ $c^2$, the space between which is that herein referred to as the "treating" zone. At the top of the chamber, at a distance above the inlet coil at such end, is fitted an outlet-pipe $c^3$, which when the treating liquid consists of a lighter liquid serves for the escape thereof together with the matter it has dissociated from the liquid under treatment, and when the treating liquid consists of the heavier liquid serves for the escape of the treated liquid; and at the bottom of the chamber, at a distance below the inlet-coil at such end, is fitted an outlet-pipe $b^3$, which when the treating liquid consists of the lighter liquid serves for the escape of the treated liquid and when the treating liquid consists of the heavier liquid serves for the escape thereof together with the matter it has dissociated from the liquid under treatment and is continued upward externally of the chamber, its overflow level being as high above the level of the chamber-bottom as will cause the column of the heavier liquid in that part of its length between these levels to equilibrate the column of the heavier and lighter liquids within the chamber between the chamber-bottom and the overflow level of the lighter liquid, this arrangement determining and automatically maintaining the meeting plane of the respective liquids within the chamber at a level (which will remain approximately constant, subject only to undulatory movement during the working of the apparatus) within the treating zone, in accordance with the respective specific gravities of the liquids in use, and rendering the apparatus continuously and automatically operative. In the case of a single chamber the determination of the height of the meeting plane of the two liquids may be made by a cock $b^4$, (shown in dotted lines,) applied to the pipe $b^3$ at a lower overflow level than that above indicated, the cock being so regulated as only to allow of the same quantity of the heavier liquid leaving the chamber as the cock $b'$ allows to enter the same. The spaces at the respective chamber ends between the inlet of the one liquid and the outlet of the other liquid (herein referred to as the separating zones) serve an important purpose in enabling each of the outflowing liquids before escaping from the chamber to separate from the other liquid. The height and capacity of such zones is determined according to the relative facility with which the liquids separate from each other, and they may be fitted with perforated diaphragms $g$ to facilitate such separation. By means of such various pipes and cocks so arranged I am enabled to regulate the flow of the respective liquids into and out of the chamber and their passage therethrough and through each other in opposite directions, as may be required, according to the circumstances of any particular case. Within the chamber and between the coils $b^2$ $c^2$ I may arrange any convenient agitating device, that represented consisting of vanes $d$, carried by a suitably-supported shaft $d'$, which passes out of the chamber through a stuffing-box $d^2$ and is rotated by gearing $d^3$.

The *modus operandi* of the improved apparatus is as follows: Assuming the chamber to be charged with a body of the heavier liquid (as the liquid to be treated) supporting a body of the lighter or treating liquid, the meeting plane X of such liquids to be within the treating zone and the cocks to be opened to the required extent, the heavier liquid enters the chamber through the top coil $b^2$ in fine streams, which emerge directly into the body of the lighter liquid and slowly descend therethrough until in a partly-treated condition it reaches the body of the heavier liquid and then assimilates therewith, while a corresponding portion of such liquid escapes from the chamber by the outlet-pipe $b^3$. Meanwhile the lighter liquid enters the chamber through the bottom coil $c^2$ in fine streams, which emerge directly into the body of the heavier and partly-treated liquid and slowly ascend therethrough, completing or furthering the desired treatment thereof until in a partly-charged condition it reaches the body of the lighter liquid and then assimilates therewith, while a corresponding portion of such liquid, together with the matter it has dissociated from the heavier liquid, escapes from the chamber by the outlet-pipe $c^3$. The liquid to be treated is thus first acted on in a minutely-divided condition by the treating-liquid when the latter is in a partly-charged condition, and then when partly treated its treatment is completed or furthered by its being acted upon by the treating liquid in a minutely-divided and fresh condition. A series of such chambers respectively adapted to operate in manner aforesaid may be combined as a battery (in which, for example, a liquid may be repeatedly treated by one liquid or by different liquids) in such manner that each chamber will operate independently as a single chamber by providing each of the pipes connecting the respective chambers at its topmost point with a branch pipe open to the air and so far upraised as to avoid any overflow of liquid, the vertical lengths of the connecting-pipes leading the liquids from one chamber to another, and consequently the relative elevations of the respective chambers being determined according to the respective specific gravities of the liquids to be used therewith.

The improved apparatus is applicable to numerous industrial operations in which such a separating, extracting, or purifying action is required—as, for example, it may be applied to the extraction or shaking out by ether or similar means of chemical products, alkaloids, or essential oils dissolved or finely suspended in water, and a series or battery of such chambers may with advantage be used for the treatment and purification of oils.

What I claim as new in apparatus for extracting or separating from liquid chemical products or matters dissolved, chemically fixed, or finely divided in suspension therein by liquid of different specific gravity than and non-miscible to a homogeneous liquid with the liquid to be treated and suitable to the obtainment of the desired result and as of my invention, and desire to secure by Letters Patent, is—

1. Apparatus for the extraction from liquids of matters contained therein, comprising a vessel provided with outlets for liquid at its upper and lower ends and with upper and lower inlets for liquid arranged between and at some distance from said outlets and each of which is provided with a liquid-distributing device, means located between said distributing devices and adapted to mix the liquids flowing therefrom, and means for controlling the passage of liquid through the lower outlet, substantially as described for the purposes specified.

2. Apparatus for the extraction from liquids of matters contained therein, comprising a vessel provided with outlets for liquid at its upper and lower ends and with upper and lower inlets for liquid arranged between and at some distance from said outlets and each of which is provided with a liquid-distributing device, means for controlling the flow of liquid through each of said inlets, and a movable mixing device located between the distributing devices, the overflow end of the lower liquid-outlet being arranged at a height above the bottom of said vessel, substantially as described for the purpose specified.

3. Apparatus for the extraction from liquids of matters contained therein, comprising a vertical elongated vessel provided with outlets for liquid at its upper and lower ends, inlets for liquid terminating in upper and lower distributing devices located within said vessel between said outlets, a mixing device located between said distributing devices, means for controlling the flow of liquid to the upper distributing device and its exit from the lower end of said vessel, and means for controlling the flow of liquid to the lower distributing device and its exit from the upper end of said vessel, substantially as described.

4. Apparatus for the extraction from liquids of matters contained therein, comprising a vessel provided with outlets for liquid at its upper and lower ends and with upper and lower inlets for liquid terminating in distributing devices arranged between and at some distance from said outlets, a mixing device located between said distributing devices, and perforated diaphragms located between the liquid-distributing devices and the top and bottom of said vessel, substantially as described.

5. Apparatus for the extraction from liquids of matters contained therein, comprising a vertical vessel $a$ having an outlet-pipe $c^3$ at its upper end for the exit of the lighter of two liquids and an outlet-pipe $b^3$ at its lower end for the exit of the heavier of the two liquids, said outlet-pipe $b^3$ having an overflow-exit at a point above the bottom of said vessel and provided with means for controlling the flow of liquid therethrough, a pipe $b$ for the inlet of the heavier liquid, said pipe being provided with controlling means and terminating in the upper part of said vessel but some distance below said outlet-pipe $c^3$ in a liquid-distributing device $b^2$, a pipe $c$ for the inlet of the lighter liquid, said pipe being provided with controlling means and terminating in the lower part of said vessel but some distance above said outlet-pipe $b^3$ in a liquid-distributing device $c^2$, and a movable mixing device located between said liquid-distributing devices, substantially as described.

6. Apparatus for treating liquids comprising the vessel $a$ with liquid-outlet pipes $c^3$, $b^3$, the liquid-inlet pipes $b$, $c$ with valves $b'$ $c'$ and perforated coils $b^2$ and $c^2$ respectively, the rotary mixing device $d$, and the perforated diaphragms $g$, the said parts being arranged substantially as described and shown for the purposes set forth.

Signed at London, England, this 21st day of June, 1898.

LOUIS CHARLES REESE.

Witnesses:
CHARLES ANDREW DAY,
ALFRED CHARLES DAY.